UNITED STATES PATENT OFFICE.

PETER FIREMAN, OF WASHINGTON, DISTRICT OF COLUMBIA.

METHOD OF POLISHING.

1,006,375.  Specification of Letters Patent.  Patented Oct. 17, 1911.

No Drawing. Original application filed October 31, 1907, Serial No. 400,004. Divided and this application filed March 16, 1908, Serial No. 421,376. Renewed March 6, 1911. Serial No. 612,717.

*To all whom it may concern:*

Be it known that I, PETER FIREMAN, a citizen of the United States, residing at Washington, District of Columbia, have invented certain new and useful Improvements in Methods of Polishing; and I do hereby declare the following to be a full, clear, and exact description of the invention, such as will enable others skilled in the art to which it appertains to make and use the same.

My invention relates to the production of a high polish upon appropriate surfaces, and particularly upon surfaces of glass (as, for instance, optical lenses), and upon certain metals to which a characteristic luster is simultaneously imparted, as, for instance, gold and platinum.

In carrying out my invention, I avail myself of the discovery made by me that the most finely divided chemically precipitated black magnetic ferro-ferric oxid, although of so fine a texture as to readily yield an impalpable powder, is, under certain conditions, capable of effectively polishing surfaces of the hardness of glass, and with a celerity and efficiency superior to that of certain oxids of iron found in nature, which, on pulverization, yield a powder decidedly rough to the touch and which are widely used in lens polishing on a large scale and for similar applications. In other words, I have found that precipitated ferro-ferric oxid, notwithstanding its impalpable fineness, develops an unexpected cutting power of such a uniform and regulable character that it may be relied upon with certainty for the production of the best standard effects, when applied under conditions of use which I have ascertained by extensive experimentation. The importance of this discovery will be the more apparent when it is remembered that in polishing with the more or less rough powders scratches are not infrequently produced which prolong the polishing operation even in the hands of the most skilful operators, and which sometimes are apparent in the finished article despite the effort made to entirely remove them. This difficulty is entirely obviated by the employment of the precipitated black, magnetic ferro-ferric oxid in accordance with my invention.

In carrying out my invention for the polishing of glass, I employ a liquid vehicle, preferably water, as a medium for bringing the precipitated ferro-ferric oxid into a condition appropriate for use. Mixed with water in the form of a paste, the precipitated ferro-ferric oxid will cake on losing water, and, if, in this condition, it is rubbed against glass, it will produce deep scratches. For a time, this seemed to be a circumstance fatal to the successful employment of the precipitated ferro-ferric oxid as a glass polisher. Further experimentation, however, developed the fact that if the paste, before caking, is inserted between the polisher, which is lined with thick felt, and the lens embedded in the pitch which covers the block, the friction incident to the rubbing of the polisher against the lens, raises the temperature sufficiently to gradually evaporate a portion of the water of the layer of paste, causing the paste to gradually approach the caky condition. Thereupon, it develops its cutting power, without scratching, which would take place if it were permitted to become too dry. On the other hand, a certain thickness or body of the paste must be maintained, if polishing at all is to take place, and I have ascertained that there is a practical range of effective polishing action between the point at which the paste becomes sufficiently dry to develop the quick cutting action, and that at which it is so dry as to threaten damage by scratching and that this range is sufficiently wide to insure the uniform production of finished articles in a highly polished condition devoid of scratches. The operator quickly ascertains the proper consistency of the partially caked paste to produce the best results. Before the cutting power of the precipitated ferro-ferric oxid was ascertained, it seemed incomprehensible that this impalpable powder should not only do as effective polishing as the much rougher materials now in use, but should actually accomplish it in a considerably shorter time. It is a quick polisher.

In making the preliminary paste, I may conveniently employ as the ingredients of the mixture say ten pounds of the precipitated ferro-ferric magnetic oxid to five gallons of water, although I do not restrict myself to these proportions. The paste mixture is to be stirred thoroughly at the time of application to the lens, and is preferably applied by means of a brush. The felt finally becomes saturated with the paste and is then in its most efficient condition. The polisher is usually arranged for continuous rotation, and the lens supporting block may either be stationary or may revolve in the same or in an opposite direction to that of the polisher, or may reciprocate, i. e., revolve, alternately, first in one direction, and then in the other.

I have just shown how well the precipitated magnetic ferro-ferric oxid lends itself to the polishing of glass. It has also very striking and characteristic properties, peculiar to itself alone, in the polishing of metals. To gold it imparts an admirable rich dark luster, in contradistinction to the lighter color imparted by jeweler's rouge. So also, to platinum, it gives a luster particularly acceptable to the eye, and which, so far as I am aware, is not produced by the use of other polishing agents. In the polishing of metals, the precipitated magnetic ferro-ferric oxid is best used in the form of sticks, in which certain waxes or stearic acid, with fats are used as binding material, and, in this form, it is also well adapted for polishing hard rubber, mother of pearl, and the like. In compounding such polishing sticks, I may conveniently use as the ingredients thereof, say 100 pounds of the precipitated magnetic ferro-ferric oxid to 17 pounds of stearic acid (stearin) and 3 pounds of beef tallow, the stearic acid and tallow being first melted and the precipitated magnetic ferro-ferric oxid being then thoroughly and uniformly incorporated in it by vigorous stirring. The addition of tallow tends to soften the stick and increase the cutting power of the compound. If desired, I may add a small quantity of rouge to the composition, to vary the luster of the finished article.

I do not claim herein the polishing agent itself, consisting of a suitable vehicle and an abrading material whose principal constituent is precipitated ferro-ferric oxid, for the reason that the same is claimed in my co-pending application, S. N. 400,004, filed Oct. 31, 1907, of which the present application is a division.

What I claim is:—

The method of polishing, which consists in mixing precipitated magnetic ferro-ferric oxid with a liquid to form a paste, applying the paste between the polisher and the article to be polished, causing a portion of the liquid to gradually evaporate, by friction, and maintaining the precipitated magnetic ferro-ferric oxid, during the polishing operation, in a condition intermediate between its initial pastiness and such dryness as would scratch the article operated upon; substantially as described.

In testimony whereof I affix my signature, in presence of two witnesses.

PETER FIREMAN.

Witnesses:
JOHN C. PENNIE,
LAURA B. PENFIELD.